US009386352B1

(12) United States Patent
Shoykhet et al.

(10) Patent No.: US 9,386,352 B1
(45) Date of Patent: Jul. 5, 2016

(54) METHODS AND APPARATUS FOR DETERMINING A NORMALIZED TIME FOR USE IN RESUMING CONTENT PLAYBACK

(71) Applicant: Time Warner Cable Enterprises LLC, New York, NY (US)

(72) Inventors: Vitaly Shoykhet, Broomfield, CO (US); Albert Straub, Westminster, CO (US); Sherri Green, Westminster, CO (US)

(73) Assignee: TIME WARNER CABLE ENTERPRISES LLC, New York, NY (US)

(*) Notice: Subject to any disclaimer, the term of this patent is extended or adjusted under 35 U.S.C. 154(b) by 0 days.

(21) Appl. No.: 14/178,041

(22) Filed: Feb. 11, 2014

(51) Int. Cl.
*H04N 21/472* (2011.01)
*H04N 21/21* (2011.01)
*H04N 21/2387* (2011.01)
*H04N 21/262* (2011.01)
*H04N 21/433* (2011.01)
*H04N 21/637* (2011.01)
*H04N 21/6587* (2011.01)
*H04L 29/06* (2006.01)
*H04N 21/20* (2011.01)
*H04N 21/2662* (2011.01)

(52) U.S. Cl.
CPC .......... *H04N 21/47217* (2013.01); *H04L 65/60* (2013.01); *H04N 21/20* (2013.01); *H04N 21/2387* (2013.01); *H04N 21/2662* (2013.01); *H04N 21/26283* (2013.01); *H04N 21/4333* (2013.01); *H04N 21/47202* (2013.01); *H04N 21/637* (2013.01); *H04N 21/6587* (2013.01)

(58) Field of Classification Search
CPC ..... H04N 21/472; H04N 5/781; H04N 5/765; H04N 21/43615; H04N 21/4333; H04N 21/812; H04N 21/8456; H04N 21/00
USPC .......................................................... 725/14
See application file for complete search history.

(56) References Cited

U.S. PATENT DOCUMENTS

2007/0047902 A1* 3/2007 Ito et al. ..................... 386/46
2011/0093885 A1* 4/2011 Ravula ....................... 725/32

* cited by examiner

*Primary Examiner* — Benjamin R Bruckart
*Assistant Examiner* — Susan X Li
(74) *Attorney, Agent, or Firm* — Straub & Pokotylo; Michael P. Straub; Abbas Zaidi

(57) ABSTRACT

Methods and apparatus relating to determining and using a normalized in progress program indicator that can be used for resuming content playback are described. In some embodiments the normalized in progress program indicator, also referred to as a normalized in progress program time, indicates a portion, e.g., fraction, of a program which has been viewed. The normalized in progress time is generated by determining an in progress program point after excluding the time of advertisements that may have been included in a content stream with the program. A user may begin watching a program on one device and resume playback of a different version of the same program on another playback device with the normalization process allowing for the playback starting point to be easily determined whether the same or a different version, with a different duration, of the program is played back.

19 Claims, 5 Drawing Sheets

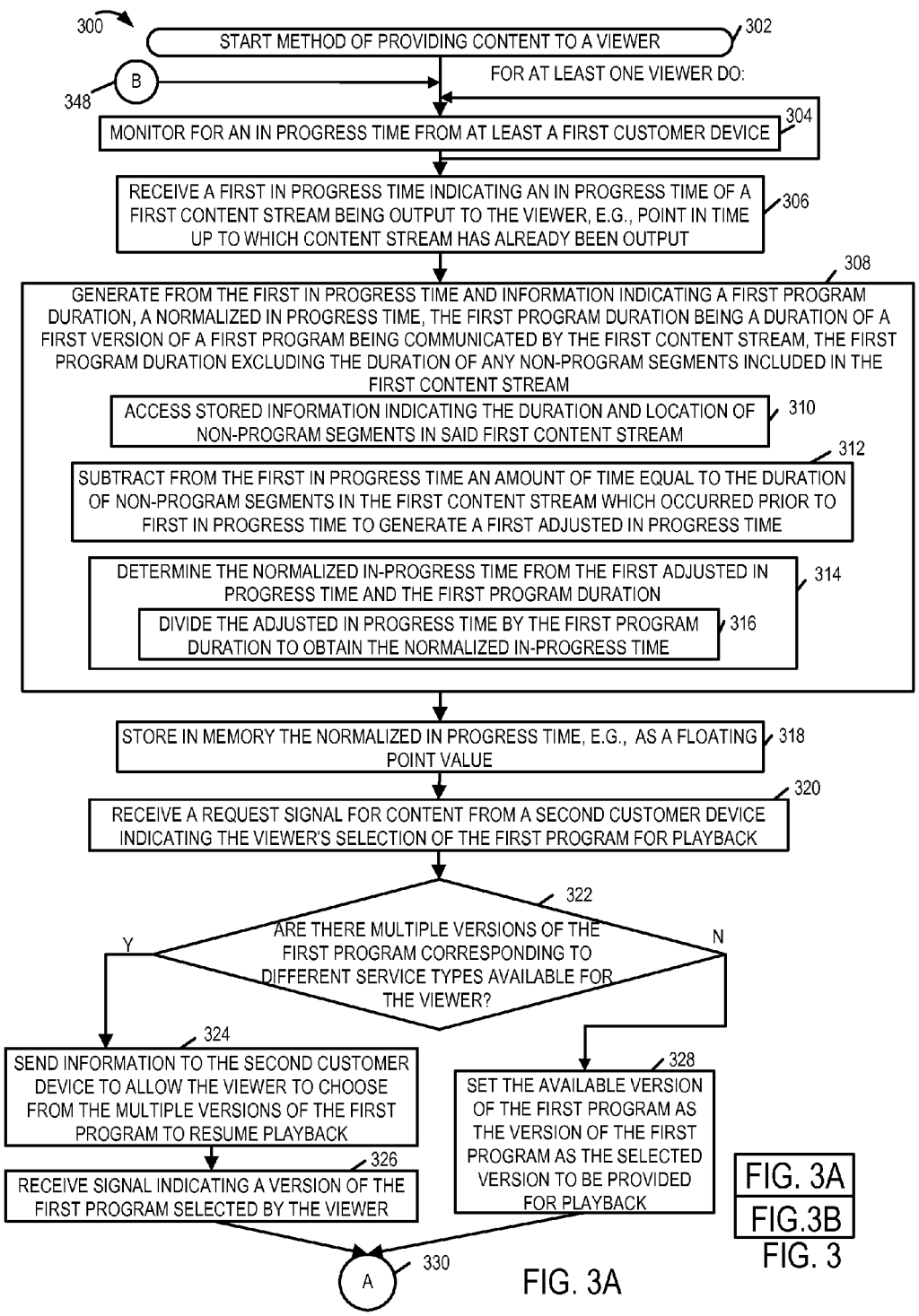

METHODS AND APPARATUS FOR DETERMINING A NORMALIZED TIME FOR USE IN RESUMING CONTENT PLAYBACK

FIELD OF THE INVENTION

The present invention relates to methods and apparatus relating to content delivery and content playback and, more particularly, to methods and apparatus for determining a normalized time that can be used for resuming content playback whether the playback is at the same or a different device and irrespective of the version of the content being played back.

BACKGROUND OF THE INVENTION

Cable network and other operators often offer access to a variety of video products in many different formats and types. Consumer digital video can be stored and accessed in many forms and via many services. A single piece of video content may be one continuous stream or sliced into several pieces such that advertisements may be inserted.

The same movie/show title can be stored and formatted so that multiple versions of the content may be available. Some versions of a program may be viewed on the TV screen using a QAM Set-top box while the same or other versions of the title maybe be available on any of a variety of IP enabled companion devices, such as the Apple iPAD, Android tablet, PC browser, smart TV, gaming station and more. At the same time a given movie/show can be available as part of different services with commercials being provided in the case of some services but not others.

As customers go from one device to another or from service to service seeking to receive content corresponding to the same program but potentially in different formats and with differing amounts of advertisements, it would be desirable if a common in progress point could be maintained.

Unfortunately, in current systems the in progress point tends to be dependent on the version of the program being played and often the content stream in which the program is provided making it difficult to use an in progress point corresponding to one presentation with a different version of the same program or when the same program is presented as part of a different service.

At issue is that the time from the beginning of a video to the bookmark or in progress point used for a presentation commonly varies depending on whether or not advertisements were inserted into the video since the advertisements affect the overall duration of the content stream to which the in progress point relates.

Advertisements generally have durations of either 30 seconds or 1 minute. Thus, a bookmark half-way through a show will vary by the number of advertisements before the NPT (Normal Play Time) in the content being viewed and the number of advertisements prior to the NPT in which the show viewing is resumed. Thus, if a user begins watching a live version of the video and then switches devices to watch a version at a later time via a Free On-Demand (FOD/VOD) asset the show will pickup at a point that may deviate by several minutes. This is an annoyance to customers who must then fast forward or rewind to get back to the point they left off.

Thus it should be appreciated that an individual piece of content, e.g., a television program, movie, etc. maybe available in various versions, e.g. a version intended for TV, an extended length version including content not included in the original movie due to intentional constraints on the duration of the movie presented in theaters, versions formatted or edited for particular frame rates, etc. Thus, for a given title, there maybe a variety of versions available with potentially different durations and with some versions being suitable for playback on some devices but not others, e.g., due to format or other issues.

In addition the possibility of different durations for a title depending on which version is being viewed, the overall duration of a content stream used to provide a particular version of a title will tend to depend on the duration of commercials, if any, included in the content stream used to provide a version of a particular title to a user, e.g., as part of a streaming or other playback operation.

Thus, it should be appreciated that the service used to provide a program, and the advertisements included therein can make it difficult to use an in progress point from one service when providing another service.

While different versions of a title and different streaming options can affect overall duration of a content stream and thus program presentation, advertisements may be placed at different locations within a content stream depending on when the content is being played back and/or on which devices the content is being played back. For example, a subscription program content steam may include advertisements at 15 minute intervals while a free, no fee, streaming version of the same version of a program may require viewing of an advertisement after every few minute segment, e.g., 5 minute segment, before the next portion of the content is streamed.

Thus, it should be appreciated that depending on the service and placement of advertisements in a content stream, a viewer halting content stream playback may be at a different location within the program content depending on which version of a program a viewer is watching and/or depending on the presence, absence and/or location of advertisements in the content stream used to provide the program content.

Many streaming services allow a user to stop viewing program content and resume steaming of program content at a later time on the same device from which content was being previously viewed. This may be achieved by simply storing the current playback position of the content stream used to provide the program content and resuming playback from the same point in the content stream assuming no changes in the content steam from the time the playback was halted and the time the playback is resumed.

As the number of devices on which a user may seek to stream content increases, e.g., with users seeking to begin content playback on a first device at a first point in time and continue content playback on a second, e.g, different device, at another time, it may not be possible to simply resume playback of the content stream to the second device. This maybe because the second device does not support the same encoding formats and thus content streams as the first device and/or the second device may not be able to receive the content stream that was being supplied to the first device because of contractual or physical distribution constraints. For example, when the second device is a cell phone or mobile device and the first device is a cable set top box, the cell phone may not be able to receive the content stream which was previously used to supply content to the cable set top box, e.g., because the cell phone will be supplied with a different version of the program than the set top box which is optimized for transmission and display on the cell phone device and/or because the cell phone is provided the program content from a different server than the set top box which does not have the same version of the program that was being provided to the set top box. For example, a first version of a program content may be delivered when an Adaptive Bit Rate (ABR) stream is used while a different version of the same content may be delivered when a linear MPEG Transport Stream (MPEG-TS) is used. The advertisements durations and/or locations in the content stream supplied to the cell phone may also be different from those provided in the content stream supplied to the set top box.

In such a situation, simply using the time, in terms of content stream location, as measured from the beginning of the content stream supplied to the set top box and using that as the time from the start of the content stream which will be supplied to the cell phone, is likely to result in the playback to the cell phone beginning at a different location within the program title than the location within the program at which the user stopped viewing program content supplied to the set top box.

It should be appreciated that there is a need for methods and apparatus which can be used to allow a user, who stops viewing a content stream including a program on a first device, to resume viewing on the same program on the same or another device with the resumption starting at or near the same place in the actual program content where the user stopped viewing the content stream on the first device.

SUMMARY

Methods and apparatus relating to determining and using a normalized in progress program indicator that can be used for resuming content playback are described. In some embodiments the normalized in progress program indicator, also referred to as a normalized in progress program time, indicates a portion, e.g., fraction, of a program which has already been viewed. Thus, while the term time is used, it should be appreciated that as a result of the normalization, units are not associated with the normalized in progress program time indicator with the indicator indicating a portion of a program that has already been viewed. The portion may be expressed as a fraction amount which could be specified as a percentage, e.g., the fractional portion of the total program length played thus far by the device multiplied by 100. Program duration can be expressed and used in terms of units of time, frames or some other measure of duration.

For example, if a program has a total duration of 100 seconds and the normalized program time expressed in percentage is 3, the normalized in progress program time would correspond to the 3 second point in the 100 second program. Alternatively, because the normalized in progress program time is not expressed in seconds or frames, the value can be applied to the total number of frames if it is desirable to determine the frame to which the normalized in progress program time corresponds, e.g., where the total program duration is expressed or known in terms of a number of frames rather than seconds. For example, if a 30 frame per second frame rate is supported and the total frame count of a program is 3000 frames (equivalent to 100 seconds of duration), a normalized in progress program time of 3 expressed as a percentage of the total duration of the program would correspond to frame 90 given that 0.03 times 3000 equals 90.

The methods and apparatus of the present invention are well suited for use where a content stream provided as part of resumption of playback may include advertisements of different durations, advertisements at different locations or simply a different number of advertisements, e.g, no advertisements, fewer advertisements or more advertisements, than a content stream which was previously being used to supply a program, e.g., a television program, movie or other audio/visual content. Thus, while the term program is used in various locations in the present application it should be appreciated that the term is not limited to television programs but is intended to also cover movies or other audio/video content.

The methods and apparatus described herein can and in some embodiments are, used to provide customers access to variety of video products, generally referred to as programs, in many different formats and types. Same movie/show titles can be viewed on the TV screen using a QAM (Quadrature Amplitude Modulated) Set-top box or on any variety of IP enabled companion devices, such as iPAD, Android tablet, PC browser, smart TV, gaming station and more. At the same time a given movie/show can be available in different types, such as: Free On-Demand, Premium On-Demand, time-shifted live or recorded on disk. As customers switch from one device to another or from type to type, for their video consumption, the customer, e.g., user, an in-progress point of show/movie they have started to watch is maintained for the customer. The In-progress point, also sometimes known as (Normal Play Time) NPT, is a relative location within audio/video stream that puts a user close to or directly at the scene he/she were watching last time.

The methods described herein can be used with and support a wide range of video playback devices allowing customers to access and interact with time-shifted video for both in-home and out-of-home environments.

Various embodiments can be used to provide a consistent user experience across multitude of video products and devices and avoid what might otherwise be an annoying inability to use bookmarking between viewings of different content accurately. The bookmarking and normalization methods allow a server to maintain accurate and manageable records for shows a customer is interacting with on a per customer basis without having to store and maintain different in progress points for each version of a program or device.

In various embodiments, multiple versions of a program are or may be available for streaming to a user's playback device. For example, an extended length version of a program may be available as well as a standard length program. The duration of individual versions of available content, e.g., programs, is known and stored in a memory, e.g., in a storage device included in or accessible to a server, e.g., a bookmark server, responsible for tracking user viewing of content and storing information which can be used to determine a playback starting point should the user select the same or a different version of the previously viewed program to continue playback.

Depending on the particular embodiment or service used to initiate playback, a user may have the choice of selecting between different versions of the same program or of receiving the selected program with or without advertisements. In some cases, such as where a user selects to resume playback on a second user device which is different form another, e.g., first user device initially used to view a portion of a selected program, the versions of the program from which the user can select may be limited because of the type of second user device. For example, when seeking to resume playback of a program previously being supplied to a set-top box via a cable network, the user may be constrained to select a version of the program which is optimized or available to the second communications device with which the user is seeking to resume viewing. The second user device may be, e.g., a mobile cell phone with the versions of the program available to streaming to such a device being limited, in some embodiments, to versions optimized for streaming over wireless connections. The duration of the version of the program to be provided to the cellular device of the user may be different from the duration of the version of the program which was being supplied to the set top box. Advertisement duration and placement may also be different in the content stream provided to the cellular device than the content stream provided to the set-top box.

In various embodiments to address the differences in program duration and possible inclusion of advertisements in a content stream, when playback of a program is halted, e.g., due to a signal from the user's device such as a stop or pause command, the position, i.e., in progress point, within the content stream which was reached is detected. The detection may be implemented in a variety of ways. In some embodiments the location is indicated in the stop or pause signal received from the user device which was being used to view the content. In other embodiments the location is known from the position reached by the streaming server when supplying content to the first user device. The position, i.e., point in a content stream where viewing is stopped, e.g., halted or paused, is normally indicated relative to the start of the content stream and may be expressed as a frame or time from the start of the content stream. In the case where the content stream includes only program content and no advertisements, the location within the program where the program is halted will be the same as the location in the content stream where the content stream is halted since there is a one-to-one match between the program and content stream.

Once the content stream in progress point where viewing of a content stream communicating a first version of a program is halted has been determined, a normalized in progress program point is determined. The normalized in progress program point indicates how far into the actual program content viewing has progressed. To generate the normalized in progress point, information about the location and duration of advertisements in the content stream that was being viewed is taken into consideration and the in progress content stream point is generated indicating how far into the first version of the program viewing progressed.

The normalized in progress program point is expressed in some embodiments as a fraction value of how far into the program being viewed the user has progressed. In some embodiments the fractional value is based on a basis of 100 and expressed as a percentage of program which was being viewed that has already been viewed.

The normalized in progress program time is stored for the program that was being viewed in a record corresponding to the user, e.g., service subscriber, who was viewing the content. Service subscriber records may, and in various embodiments will, included normalized in progress points for each of a plurality of programs that a user at least partially viewed with different records being kept for each of a plurality of subscribers. A subscriber identifier included in the subscriber record is also included in the halt, stop or play commands along with information identifying a program and/or version of a program to be played or controlled. In this way, the server implementing the command and/or a bookmarking server storing in progress point information can easily correlate commands and requests for content playback with individual subscriber records and the programs for which in progress information is stored.

In the event of a playback request by a user, made via the same or a different playback device than was being previously used by the user to view content, the bookmarking server is consulted to determine if a normalized in progress time has been stored for the subscriber and the program which is to be played back.

Assuming a normalized in progress play time has been stored for a requested program for the user/service subscriber initiating playback, the normalized in progress play time is converted to a content stream in progress playtime based on information about the duration of the particular version of the program which will be played back and information about advertisements, if any that will be included in the playback content stream and the location of advertisements to be included.

In at least some situations, the version of the program which is played back will be different from the version of the same program which was previously being played. This can occur because the user is requesting playback using a device such as a cell phone to which the previously played version can not be streamed or which is in a format which is not supported by the playback device, e.g., a cell phone using MPEG4 ABR vs a set-top box using a linear MPEG2-TS. The version of the program which is played back may be different if the user selects to playback a different version of the program than the one which was previously played.

Given that the program in-progress point is stored in a normalized format e.g., as a percentage of the program duration which has already been viewed, at the time of the playback request the sever providing the content or determining where to start playback of the version of the program to be played need not be concerned with the length or version of the program which was previously being viewed or where advertisements may have been placed in the content stream which was used to supply the part of the program which was previously viewed.

The normalized in progress point is applied to the version of the program which is to be played and a content stream progress point is then determined based on what, if any, advertisements are to be included in the content stream which is to supply the remaining portion of the program to the user.

The program in-progress point to be used when supplying the previously unviewed portion of the program can be determined by simply multiplying the normalized in progress program point by the duration of the particular version of the program from which the content will be supplied. The stream in-progress point is then determined by adding the duration of any advertisements which would be included in the content stream which will be used to provide the remaining program portion which were scheduled to have been communicated prior to the determined in program press point. In this manner, the in-progress program point can easily be used to determine a content stream in progress point to be used in determining where streaming should be initiated following a request, e.g., a resume playback request, corresponding to a previously viewed title.

By storing and using a normalized program in progress point indicator, the methods and apparatus described here can be used to support playback of any one of a plurality of version of a program.

As should be appreciated, while the program and content stream in-progress points determined in the manner discussed herein are used in determining where streaming should start from for a program whose streaming is being resumed to the same or a different device, the actual streaming starting point may be set slightly ahead of the determined in progress content stream or in progress program point, e.g., 30 seconds or more back, to reduce the risk that a small portion of the program may be skipped when resuming program playback.

Various features of the invention allow a service provider to generate, maintain and provide access to a single in-progress point for each content asset, e.g., show, event, movie, series title, within customer reach on a per user or subscriber basis. To generate an in-progress point that is transferable across a plurality of supported stream types, the show/event length is normalized by focusing on programming content included in a content stream which may also include non-programming content, e.g., advertising content, as well.

In some but not necessarily all embodiments normalizing an progress point is achieved by subtracting length of advertising breaks from the current content stream-length, where the current content stream length includes both the length of programming and advertising content weather the advertising content is added at the network headend or is inserted at the customer premise or in the playback device to form the content stream.

Advertisement (ad) break locations and lengths are marked in some embodiments in content streams by SCTE-35 inband signaling for live and recorded content and described by schedule files created by networks. In some embodiments for on-demand streams, a digital advertisement insertion (DAI) system architecture is relied upon where a playlist with the ad placements are generated and sent to the client at the beginning of the on-demand session and each ad pod or individual ad break is marked. In various embodiments each ad pod location and length can and is identified using the advertisement metadata or other information provided by, e.g., the provider of content and/or digital ad insertion system. Additionally in various embodiments the full event length is also available to from multiple data sources including On-Demand, Guide or Search catalogs/web services.

This advertisement information and/or content stream and program duration information can and is used in some embodiments for determining the normalized program in-progress point for a content stream which is stopped prior to being fully viewed. The information is also used in some embodiment as will be discussed below to determining the starting playback point for a content stream to be supplied in response to a request to resume playback of the same or a different version of content, e.g., a program, which was previously being viewed.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

It should be appreciated that numerous additional variations and embodiments are possible and remain within the scope of the invention.

Various additional features, embodiments and advantages of the present invention are discussed in the detailed description which follows.

DETAILED DESCRIPTION

Figure 1:
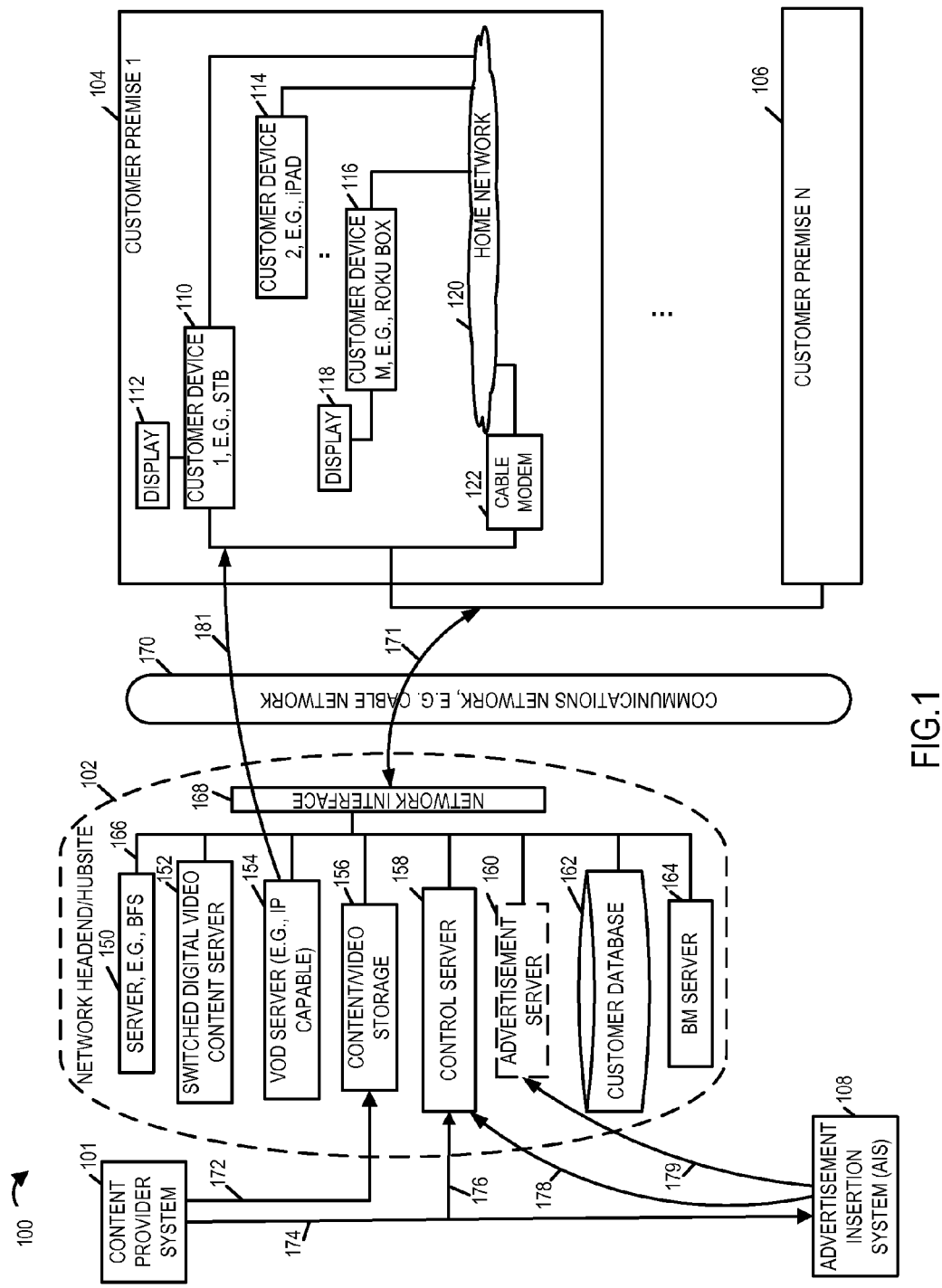
FIG. 1 illustrates an exemplary system implemented in accordance with the some embodiments of the present invention.

FIG. 1 illustrates an exemplary system 100 implemented in accordance with one exemplary embodiment of the present invention. The system 100 supports delivery of content to customer premise equipments (CPEs) including content playback devices in accordance with various embodiments of the invention. The system 100 includes a content provider system 101, network headend 102, a communications network 170, e.g., a hybrid fiber-coaxial (HFC) network, satellite network, and/or internet, a plurality of customer premises 104, 106, and an advertisement insertion system (AIS) 108. In cable network embodiments the network headend is a data or other service center to which multiple households are normally coupled and where one or more servers are located. In other types of networks the network headend 102 may, and sometimes is, implemented as a data center with one or more servers and/or other equipment used to provide video and/or other services. In various embodiments the content, e.g., multimedia content, is delivered from the headend 102 over the communications network 170 to one or more devices at the customer premises 104, 106 via content streams depending on the customer device capability and/or user preference. In some embodiments the customer premises 104, 106 include a variety of devices including, e.g., legacy set top box (STB) devices, IP capable devices such as laptops, iPADs, Android tablets, smart TVs, streaming devices such as ROKU® box etc.

The content provider system 101 is illustrated as a single system but may include a plurality of servers corresponding to various content providers including providers of live content. The content provider system 101 provides content to the headend 102 for delivery to customer devices. For illustration purposes the arrow 172 from the content provider system 101 is shown to provide content to the storage 156. In various embodiments slots are pre allocated for advertisements (ads) by the content provider system 101 in which advertisements can be placed. The content provider system 101 also provides advertisement metadata (as indicated by arrows 174, 176) including advertisement slot location and length/duration in terms of time, to various servers of system 100. This information is used by various devices such as the advertisement insertion system 108, advertisement server 160 and/or the content servers 150, 152, 154 to manage insertion of advertisements (ads) in the content stream and/or for play out of ads during the advertisement slot durations. As will be discussed, the advertisement location/position information is also used to calculate and/or adjust an in-progress time in accordance with the invention.

The network headend 102 may be implemented at a cable network office or hubsite serving a plurality of customer premises and includes multiple servers and databases which are coupled together as shown. In the FIG. 1 example, the headend 102 includes a content broadcast server 150, e.g., a broadcast file server (BFS), a switched digital video (SDV) content server 152, a video on-demand (VOD) server 154, a content storage 156, a control server 158, an advertisement server 160, a customer database 162 and a business management server 164. The term VOD server is intended to cover a wide range of different types of VOD servers and is not limited to a particular analog or IP (Internet Protocol) based embodiment or an embodiment which is limited to delivery via a particular type of network. It should be appreciated that some of the servers and/or elements shown to be included in the headend 102 may reside outside the headend 102 in some embodiments and may be located anywhere in the system 100, e.g., in a distributed manner. In the FIG. 1 example, various servers and other elements included in the headend 102 are coupled together by a local network 166. The local network 166 is coupled via one or more network interfaces 168 to other networks and/or devices. For example, the headend 102 is coupled via network interface 168 to communications network 170, e.g., a cable network, and may also be coupled to one or more other external networks.

Via the network 170, the elements shown in the network headend 102 can send and/or exchange various information with the devices located at the customer premises 104, 106. As shown in FIG. 1, communications link 171 traversing the communications network 170 couples the CPEs at the customer premises 104, 106 to the various elements/servers shown in the network headend 102.

The content server 150, e.g., a broadcast file system (BFS) which may be implemented using a server or other broadcast device, among other things, is responsible for delivering, e.g., broadcasting, content including program content and advertising content and/or other information to one or more customer devices, e.g., set-top boxes, which support receiving content by tuning to, e.g., QAM broadcast stream broadcast by the server 150. The switched digital video (SDV) server 152 provides digital content to customer devices which support receiving SDV content. The video on-demand (VOD) server 154 is responsive to on-demand requests and delivers, on-demand programming content including that which is ordered by one or more customers and/or other information to one or more customer devices, e.g., set-top boxes. In some embodiments the VOD server 154 is configured to deliver content to one or more customer premises via an IP channel (Content Distribution Network or CDN) and/or a VOD channel. For illustration purposes the arrow 181 from the content provider system 101 is shown to provide a content stream to a customer device. The content storage 156 stores content, e.g., audio, video and/or other multimedia content. The advertisement server 160 includes a cache of advertisements that can be included in the content transport streams delivered by the various servers. In various embodiments the content servers 150, 152, 154 access the programming content from the content storage 156 and generate content streams suitable for delivery to various CPEs via the communications network 170. In some embodiments the content stream includes advertisements along with programming content. In some embodiments premium on-demand content is delivered to customer devices without advertisements.

The control server 158 is optionally included in the headend 102 and may reside externally and is also sometimes referred to as the bookmarking server due to the bookmarking functions it performs in accordance with the invention. The control server 158 in some embodiments is configured to receive a first in progress time indicating an in progress time of a first content stream being output to a viewer, and generate from the first in progress time and information indicating a first program duration, a normalized in progress time. The first program duration is the duration of a first program being communicated by the first content stream. In some embodiment the first program duration excludes the duration of any non-program segments, e.g., advertisements, included in the first content stream. In accordance with the features of present invention, the generated normalized in progress time is used to allow the customers to resume playing content they were watching earlier at some point in time, on the same or any other different customer device they choose to pick, from the point they left off. This places the customer as close as possible to the location/position in the content stream where they left watching. The normalized in-progress time generated by the control server 158 is a universal value transferable across various content stream types supported by the system 100.

The customer database 162 includes, for a plurality of customers, customer information, e.g., customer profile, customer account information and information regarding the devices installed at customer premises. In some embodiments customer account information includes, e.g., account number, subscription/service information, customer device capability and other billing related information. Customer database 162 also includes customer device information, e.g., identification and/or other information regarding customer devices such as STBs, streaming devices, gateways, modems etc., installed at various customer premises served by the headend 102. BM (Business management) server 164 processes billing information corresponding to customers serviced by the headend 102. This may include updating billing charge information in response to changes in services being provided to the customer, upgrades, on-demand content purchases, and/or other activity.

The digital advertisement insertion system 108 is responsible for generating advertisement placement information for on-demand sessions using advertisement slot location information provided by the provider of the on-demand/live content. In some embodiments the advertisement insertion system 108 generates and sends a playlist with advertisement placement information to the client devices, e.g., customer devices such as STBs, at the beginning of an on-demand session and each advertisement Pod or individual ad break is marked. Thus the customer device can identify each ad pod location and length. The advertisement placement information is also provided by the advertisement insertion system 108 to the control server 158 and the ad server 160 (as indicated by arrows 178, 179). In some embodiments the ad server 160 gets the advertisements in queue to be played in lieu of the original content during the advertisement slot duration and begins play out of advertisements upon receipt of an advertisement indicator, e.g., an SCTE-35 advertisement indicator, from the advertisement insertion system 108. The advertisement indicators are used to provide more accurate placement than achievable by time synchronization alone.

Referring now to the customer premises shown in system 100. Each customer premise 104, 106 may include a plurality of CPEs including playback devices. In various embodiments the CPEs located at the customer premises include, e.g., modems, gateway devices, routers, and playback devices including, e.g., set top box, internet capable TVs, personal computers, laptops, tablet devices, smart phones etc. In various embodiments a content playback device presents the program content to a viewer, e.g., customer/subscriber. FIG. 1 shows some details of customer premise 1 104. Customer premise N 106 may be similar to the customer premise 104 and may include same or similar CPEs.

The customer premise 104 includes a modem 122 and various customer devices including a customer device 1 110, customer device 2 114, . . . , and customer device M 116. Thus it should be appreciated that a variety of devices may exist at a single customer premise where the devices may be coupled together by a home network 120.

As shown, the customer device 110, e.g., a STB, is coupled to display device 112, customer device 2 114 is e.g., a tablet device such as an iPAD, and the customer device M, e.g., a steaming device such as a ROKU box, is coupled to display device 118. It should be appreciated that in some embodiments customer devices can be integrated in a device which also includes a display. The display devices could be, e.g., standard televisions. In some embodiments the STB 110 may be e.g., a legacy QPSK STB, a DOCSIS (Data Over Cable Service Interface Specification) set top box, an SDV capable set top box, an IP-STB, and/or a hybrid set top box. The SDV capable set top box devices support receiving SDV programming content from the SDV server 152 while the legacy STBs receive programming content via a QAM broadcast stream from BFS 150. The customer devices 114 and 116 are capable of receiving IP program content streams and performing playback. In some but not necessarily all embodiments the SDV server has pre-allocated QAM bandwidth that is used to provide the requested content when a user requests a QAM video channel that is not already being delivered using bandwidth to which a user can tune and recover the desired channel. The SDV server can allocate a portion of the bandwidth available to it and switch the desired QAM video channel onto that allocated bandwidth to server a request for a channel which is not already available to a requesting user. When the user is done watching, or the channel times out, the QAM video channel is switched off of the allocated bandwidth and thus the bandwidth is reclaimed and the SDV server can reuse the bandwidth to deliver other content.

Figure 2:
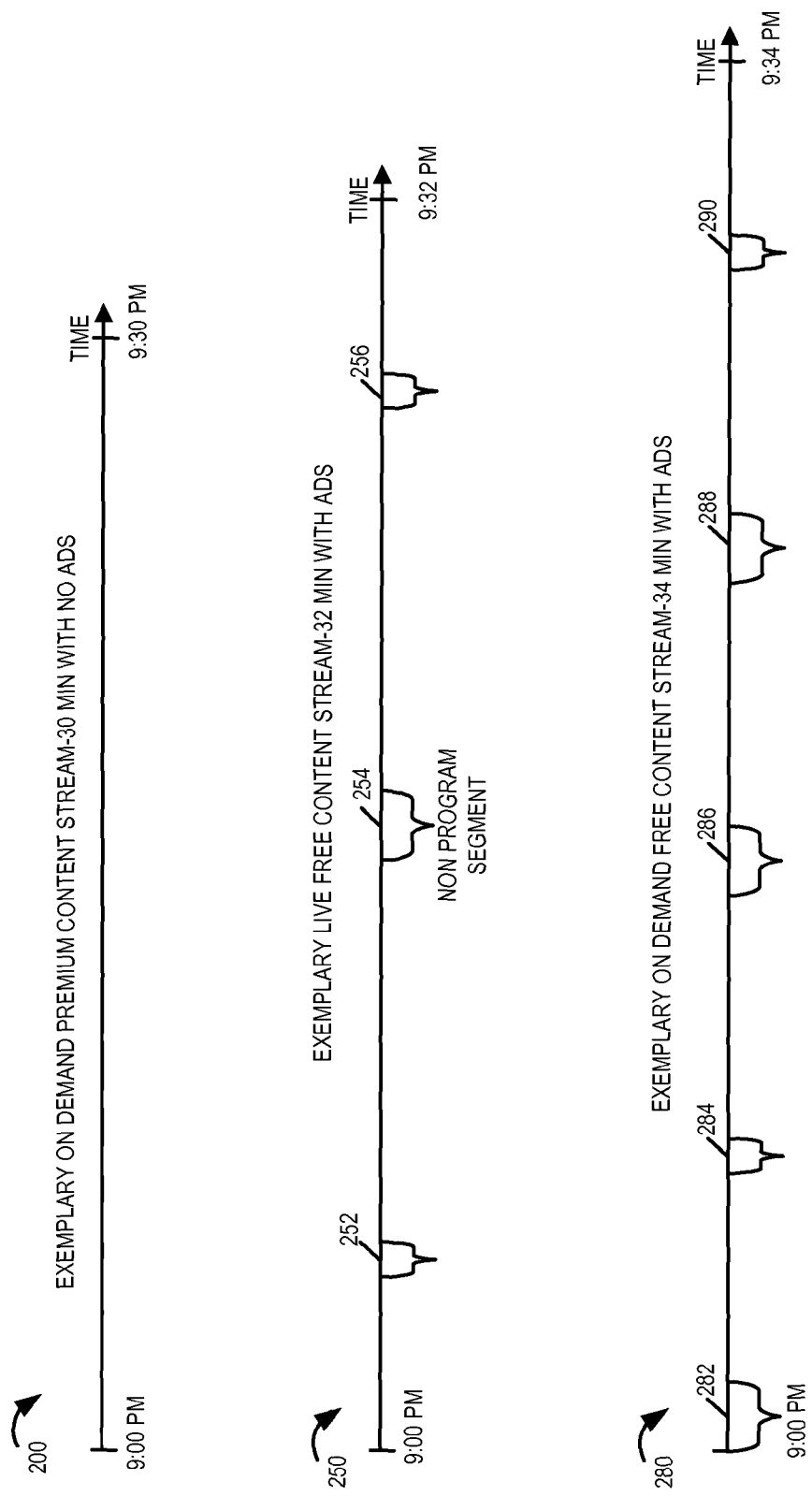
FIG. 2 illustrates various content stream types corresponding to various different types of services, that a user may choose from, for delivery of programming content.

FIG. 2 illustrates various exemplary content stream types corresponding to various different types of services, that a user may choose from, for viewing programming content. As will be discussed, different types of content streams corresponding to different types of services may support different versions and formats of content. Different versions of a given program are suitable for different types of services and/or different types of playback devices. For example, some versions of the program may be formatted for a particular frame rate which is supported by some devices but not others. While the device type may constrain which version of a program is to be supplied to the customer for viewing, the program version may also be determined as a function of the service to be provided with some program versions being available via some services but not others. For example extended length program versions with extra commentary or scenes may be available for On-demand premium while only standard length versions may be available for Live or Free services. For example, a first content stream type corresponding to a first type of service may support communicating a first version of a program while a second content stream type corresponding to a second type of service may support communicating a second version of the same program. The different versions of the same program may differ in, e.g., duration, format, coding type etc.

The first content stream type shown by drawing 200 is an exemplary on-demand premium content stream corresponding to a on-demand premium service. As should be appreciated from the drawing, the exemplary on-demand premium content stream 200 includes 30 minutes of programming content in a first version without any advertisement breaks. Thus the user/customer viewing on-demand premium content stream 200 will not have to watch or sit through one or more commercial breaks which are normally inserted in various other programming content streams. In some embodiments the service provider charges more to the customers who choose to view the on-demand premium version of the program via the on-demand premium service compared to other available services where other versions of the same programming content may be provided along with commercial advertisements.

The second type of content stream illustrated in FIG. 2 is a Live Free content stream 250 corresponding to an exemplary Live Free service. The exemplary Live Free content stream 250 includes 32 minutes of total content including 2 minutes for non-program segments, e.g., advertisement breaks. Thus the total stream duration for content stream 250 in this example is 32 minutes. The advertisement break slots in the Live Free content stream 250 are represented by reference numbers 252, 254 and 256. Remaining portion of the Live Free content stream 250 includes a second version of the same programming content (same title) as communicated by the first content stream 200 but that is suitable for or corresponds to the Live Free service. The location of each of the advertisement slots shows where a particular advertisement will occur while the length of each of the advertisement break slot represent the duration in time for which an advertisement will be played. The advertisement break slots 252 and 256 are 30 seconds long while the advertisement break slot 256 is 60 seconds long.

The third type of content stream illustrated in FIG. 2 is a On-Demand Free content stream 280 corresponding to an exemplary On-demand Free service. The exemplary On-Demand Free content stream 280 includes 34 minutes of content including 4 minutes for advertisement breaks. The advertisement break slots in the content stream 280 are represented by reference numbers 282, 284, 286, 288 and 290. Remaining portion of the On-Demand Free content stream 280 includes a third version of the same programming content (same title) as communicated by the first content stream 200 but that is suitable for or corresponds to the On-demand Free service. The location of each of the advertisement slots shows where a particular advertisement will occur while the length of each of the advertisement break slot represent the duration in time for which an advertisement will be played. The advertisement break slots 282, 286 and 288 are each 60 seconds in duration while the advertisement break slot 284 and 290 are each 30 seconds long.

While in the above example of FIG. 2, different versions of the same program content are illustrated as having same program segment duration of 30 minutes, it should be appreciated that in various cases the program segment duration of different versions of the same program may be different. For example in one particular case a on-demand premium version of a program, e.g., pay per view game event, that a user can view using the on-demand premium service is 30 minutes long (without advertisements) while a second version of the same game event has a adjusted program duration of 25 minutes (without advertisements) for viewers watching using the on-demand free service.

Figure 3B:
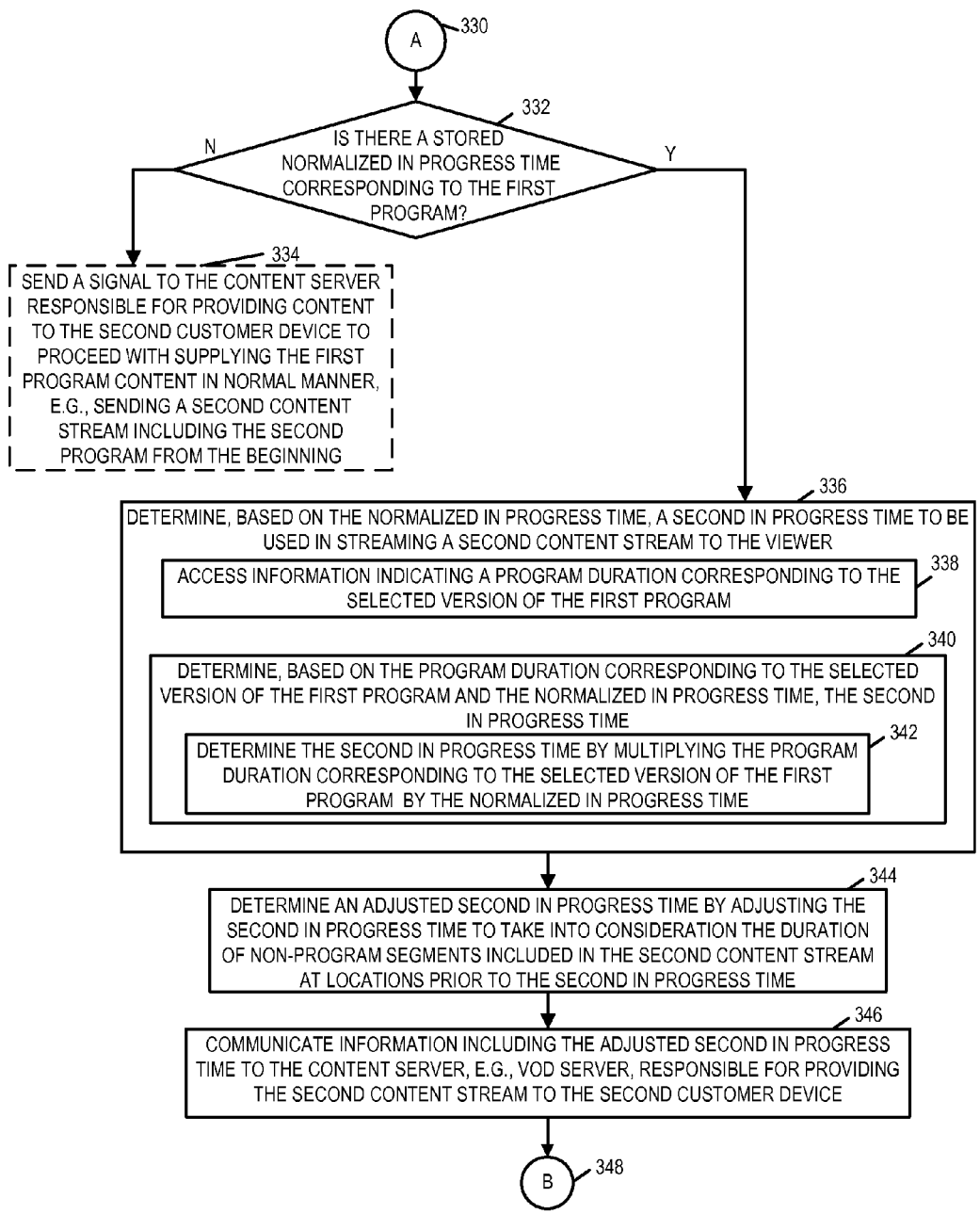
FIG. 3, which comprises a combination of FIGS. 3A and 3B, is a flowchart illustrating the steps of an exemplary method of operating an exemplary control device, e.g., a bookmarking control server, in accordance with an exemplary embodiment implemented using the system shown in FIG. 1.

FIG. 3, which comprises a combination of FIGS. 3A and 3B, is a flowchart 300 illustrating the steps of an exemplary method of providing content to a viewer, e.g., customer, in accordance with an exemplary embodiment implemented using the system shown in FIG. 1. In some embodiments various steps of the method illustrated in FIG. 3 are implemented by the exemplary control server 158 (also referred to as the bookmarking server) shown in FIG. 1.

Operation starts in step 302, e.g., with the control server being powered on. In various embodiments various illustrated steps are performed for one or more customers viewing content, e.g., movies, TV shows, music etc. In step 304 which is performed on an ongoing basis the control server monitors for, a signal indicating an in-progress point in time corresponding to a content stream communicating a program, from user device. The in-progress time corresponding to the content stream including the program content that a viewer has started to watch indicates a relative location within a content stream (e.g., audio, video and/or multimedia stream) that represents a point up to which the content stream has been played out. The content stream may include both the program and non program (e.g., ad) segments. Thus in progress time corresponding to, e.g., a first content stream including a first program, indicates a point in time up to which the first content stream has been viewed or played out to the viewer relative to the start of the program. For the purpose of discussion, consider that a customer is viewing some programming content, e.g., a first version of a first program, communicated by a first content stream. Consider for example that the first program corresponds to, for example, the movie TITANIC. In some embodiments a plurality of version of a single program content are possible, e.g., because of a plurality of types of services via which the program content can be viewed and/or different content stream types that communicate the program. Different versions of a program may be suitable for different types of services available to the customer for viewing, e.g., Live, On-demand premium, On-demand Free, etc. Thus a customer may view a first version, e.g., premium version, of a first program using, e.g., on-demand premium service at a first time and then later the customer may view the same first program (same title) in, e.g., a second version (e.g., with ads), using, for example, a free on-demand service depending on the availability. In some embodiments the content communicated by the content stream and being output to the viewer includes both the actual first program as well as the advertisements which could either be inserted/embedded in the content stream including the first program and/or otherwise communicated and presented to the viewer during the advertisement break portions marked in the content stream communicating the first program the customer is viewing. In accordance with one feature the customer's playback device, e.g., STB or another device monitors the time as it progresses during the play out of the content since the start. When the customer stops or pauses the playback of the content, in accordance with one aspect the customer device reports the in-progress time, e.g., a first in-progress time, to the control server.

Operation proceeds from step 304 to step 306. In step 306 the control server 158 receives a first in progress time ($IP_1$) indicating an in progress time of the first content stream being output to the viewer, e.g., indicating a point in time up to which the first content stream has been output from the point the play out started. In some embodiments the signal communicating the first in progress time also communicates information regarding the customer device outputting the first content stream for which the first in progress time is reported and information regarding the customer/viewer, e.g., subscriber or owner of the customer device. The information may include user identification information such as account number, name etc. The device information may customer device identifier, device type identifier and information indicating the content stream types that are supported by the customer device. As discussed above, different versions of the same program may be viewed using different service that supports a corresponding program version. It should be appreciated that the first in progress time corresponding to the first content stream communicating the first program cannot be applied directly to another content stream communicating a different version of the same first program. However as discussed below the features of the present invention provides a in progress point value that can be calculated and applied to various different stream types corresponding to various different versions of the same program.

Operation proceeds from step 306 to step 308. In step 308 the control server generates, from the first in progress time and information indicating the first program duration, a normalized in progress time, the first program duration being a duration of a first version of the first program being communicated by the first content stream, the first program duration excluding the duration of any non-program segments, e.g., advertisement segments, included in the first content stream. Thus the first program duration in this example includes duration of the first version of the movie TITANIC without advertisements. In some embodiments the information regarding the first program duration and the duration and location of non program segments, e.g., advertisement segments, included in the first content stream is provided to the control server 158 by one of the content servers 150, 152, 154 and/or the advertisement server 160 and/or by the content provider system 101. The information regarding the first program duration is also maintained along with the first program content in the content storage 156 from where it can be accessed by the control server 158. In some embodiments the control server 160 stores the information regarding the duration and location of non program segments provided by the other servers and systems.

In various embodiments the step 308 of generating the normalized in progress time includes one or more of steps 310, 312, 314 that are performed as part of implementing step 308. In step 310, the control server accesses stored information indicating the duration and location of non program segments in the first content stream. The information indicating the duration and location of non program segments in the first content stream may have been communicated to the control server 158, e.g., from the content provider system 101 and/or AIS 108, and stored at some point in time. In step 312, as part of generating the normalized in progress time, a calculation unit in the control server 158 subtracts from the first in progress time, an amount of time equal to the duration of non-program segments in the first content stream which occurred prior to first in progress time, to generate a first adjusted in progress time. Thus the adjusted in progress time is calculated by taking out the duration of all advertisement segments in the first content stream which occurred before the first in progress time from the received first in progress time. In step 314 the normalized in-progress time is determined from the calculated first adjusted in progress time and the first program duration. In various embodiments the step 314 of determining normalized in-progress time includes dividing the adjusted in progress time by the first program duration.

Thus a normalized in progress time (NrPT) calculated in accordance with the invention as a normalized percentile point can be represented by the following equation:

$$NrPT = \frac{[\text{Adjusted First In-Progress Time (Adj. } IPT_1)]}{[\text{First Program Duration } (D_1)]} \times 100 \quad (1)$$

where NrPT is the normalized in progress time calculated in the manner described in step 308, Adjusted First In-Progress Time represented as Adj. $IPT_1$ is calculated as described in step 312 and the first program duration $D_1$ is the duration of the first version of the first program content only (i.e., excluding the duration of any non-program segments, e.g., advertisement segments). In the above equation (1), the multiplication factor of 100 serves to put the normalized value in a percentile point format.

where Adj.$IPT_1$=[First In-Progress Time ($IPT_1$)−Duration of non program segments that occurred prior to First In-Progress Time]

Operation proceeds from step 308 to step 318. In step 318 the control server stores the calculated normalized in progress time NrPT. In some embodiments the in progress time NrPT is saved as normalized percentile point in floating integer format. In some embodiments the control server creates a log including customer/viewer's information, e.g., account number etc., content identification information identifying the content, e.g., first program for which the log is created, content stream type, service type used for viewing, customer device identification information identifying the customer device that was outputting the first program content and calculated normalized in progress time NrPT. The normalized in progress time (NrPT) calculated in accordance with the invention as discussed above can be used to allow the customer to playback the same content/title from the point the customer stopped viewing and is transferable across various content stream types supported by various customer devices. Using the normalized in progress time (NrPT) the service provider can put the customer very close or even directly at the scene that the customer was watching last time before stopping.

Operation proceeds from step 318 to step 320. To better understand the remaining steps of the method 300 and functioning of the control server implementing the steps, consider that at some later point in time after having stopped the content play out, the viewer wants to resume playing the same content/title from the point/scene where the customer stopped watching last time. Also consider that at this later time the user wishes to view the content using a different customer device, e.g., a second type customer device different than the one used for playback earlier.

In step 320 the control server 158 receives a request signal for content from a second customer device indicating the viewer's selection of the first program (e.g., TITANIC) for playback. The request signal may be sent when the customer operates the second customer device to resume playing the first program, e.g., selecting the content/title from a playlist and/or guide. In some embodiments the received request signal includes, in addition to the information identifying the requested program, at least some information identifying the customer/viewer, e.g., subscriber's account information or other identification information, second customer device identification information and device type (e.g., STB, iPAD, Smart TV etc.) information, and the content stream formats that the second device supports etc.

Operation proceeds from step 320 to step 322. In step 322 the control server 158 checks if there are multiple versions of the first program, e.g., corresponding to different service types that can be used for viewing, available for the given viewer. Various different versions of the same title corresponding to different types of services, e.g., On-Demand Premium content, Live free, On-Demand Free or other types of services using which the selected program can be viewed, may be available to the viewer. In some embodiments upon receiving the request signal, the control server 158 in step 322 determines what different options, if any, are available for resuming playback of the first program to the given viewer. If the program is listed, e.g., in a playlist and/or guide, at least one version of the selected first program corresponding to at least one service is available.

If in step 322 it is determined that multiple versions are available, the operation proceeds from step 322 to step 324 where the control server sends information to the customer device to allow the viewer (operating the second customer device) to choose from multiple available versions of the first program to resume playback. After receiving the information from the control server the second customer device may, and in some embodiments does, presents a prompt to the user with a list of options to choose from. The options include list of various different versions of the first program corresponding to the available services types. For example, the first program may be available to the viewer for playback as e.g., On-Demand Premium content with no advertisement breaks, as On-Demand Free content, or in another version. Each of the versions may be communicated in a different type of content stream corresponding to the type of service that corresponds to the type of version. When the options are presented, the viewer may select one of the options from the list according to his preference to resume playing. The viewer selected option is received by the customer device and a signal is automatically sent to the control server 158 communicating the viewer's selection.

Operation proceeds from step 324 to step 326. In step 326 the control server receives a signal indicating a version of the first program selected by the viewer. Operation proceeds from step 326 to step 332 via connecting node A 330.

If in step 322 it is determined that multiple versions are not available, operation proceeds from step 322 to step 328 where the control server considers the only available version of the selected program as the version to be supplied to the viewer for playback. Operation proceeds from step 328 to step 332 via connecting node A 330.

Returning to step 33. In step 332 the control server 158 checks if there is any record of a normalized in progress time corresponding to the first program selected by the customer/viewer, e.g., stored by the control server at some point in time earlier. If a stored normalized in progress time corresponding to the selected title is not found, the operation proceeds from step 332 to step 334. Although in the example of FIG. 3 flowchart, a case is illustrated where a normalized in progress time corresponding to the first program (TITANIC) is stored (step 318) because the viewer watching the first program stopped viewing at some point and an in progress time was reported (306), step 334 is shown as an optional processing step (in a dashed box) to illustrate the operation performed by the control server in the cases where the customer may not have been watching the currently selected title earlier, and/or no in progress time information is available corresponding to the selected program. This is possible in various scenarios, e.g., where the customer selected to view the selected program, e.g., for the first time or when the viewer selects to start playback from the beginning of the selected program rather than from the previous in progress time where it was stopped.

Thus when it is determined that a normalized in progress time corresponding to the first program is not stored, operation proceeds to step 334. In step 334 the control server 158 sends a signal to a content server, e.g., one of the servers 152, 154, responsible for providing selected program content to the second customer device to proceed with supplying the content corresponding to the selected title in the normal manner, e.g., providing a content stream including the first program starting from the beginning of the program.

If in step 332 it is determined that a stored normalized in progress time corresponding to the first program is found (as should be the case in FIG. 3 example), the operation proceeds from step 332 to step 336 via connecting node A 326. It should be appreciated while the selected program may be provided to the second type customer device by, e.g., VOD server 154, in order to resume playing from the last in progress point, the control server 158 needs to compute and provide in progress time information corresponding to the selected version of the first program, e.g., calculated for the type of service (e.g., on-demand premium, free etc.) corresponding to the selected version of the title, to the VOD server 154 so that the VOD server 154 can provide a content stream including selected version of the first program (e.g., TITANIC in this example) from the last in progress point where the viewer stopped watching.

In step 336 control server determines, based at least on the normalized in progress time (NrPT), a second in progress time to be used in streaming a second content stream to the viewer. In various embodiments the second content stream includes content corresponding to the same program title as the first content stream. In some embodiments the first and second content streams differ in at least one of non-program segment content or overall stream duration. While the determination is based at least on the normalized in progress time (NrPT), other information is also considered in various embodiments while determining the second in progress time. In some embodiments the other information includes, program duration information, information regarding advertisement segment locations and durations in the second content stream to be provided to the customer device etc. In various embodiments step 336 includes steps 338 and 340 which are performed as part of implementing step 336. In step 338 information indicating a program duration corresponding to the selected version of the first program is accessed by the control server. The program duration of the selected version of the first program may be different than the first program duration if the corresponding service types used for viewing the program are different. In some embodiments the program durations for different versions corresponding to the same title are modified by the service provider to content streams used for providing the different versions of the same program. The information indicating the program duration may be provided by the content provider system 101 and stored by the control server 158 or the information may be accessed from an external server.

In step 340 the control server determines, based on the program duration corresponding to the selected version of the first program (denoted by $D_2$) and the normalized in progress time (NrPT), the second in progress time. In various embodiments the program duration of the selected version of the first program used for calculating the second in progress time does not include the duration of non program segments, e.g., advertisements. In accordance with some embodiments of the invention, the calculated second in progress time is used to arrive at the point in time in the second content stream including the selected version of the first program that is the same or very close to the point in time in the first content stream where the viewer stopped watching. Step 342 is performed as part of determining step 340 to calculate the second in progress time. In step 342 the second in progress time is calculated by multiplying the program duration corresponding to the selected version of the first program to the normalized in progress time (NrPT).

Thus using the normalized in progress time (NrPT) and the program duration corresponding to the selected version of the first program ($D_2$), the second in progress time ($IPT_2$) can be calculated as:

$$IPT_2 = \frac{[(NrPT) \times (D_2)]}{100} \quad (2)$$

In the above equation (2) a division factor of 100 is used in the denominator since the normalized in progress time value (NrPT) used in calculation above is expressed in percentile point format due to the multiplication factor of 100 used in equation (1).

Operation proceeds from step 336 to step 344. In the step 344 the calculated second in progress time is adjusted to take into consideration the duration of non program segments, e.g., advertisements, in the second content stream that may have occurred at time locations prior to the second in progress time. The adjustments in the second in progress time are made to place the viewer as close as possible to the last scene that the customer viewed, e.g., by adding durations of advertisements that have appeared before the calculated second in progress time. In various embodiments the information regarding the location and duration of advertisements in the second content stream is made available to the control server, e.g., by the content provider system 101 and/or AIS 108. The adjusted second in progress time obtained by making the adjustments to the calculated second in progress time can be expressed as:

Adj.$IPT_2$=[Second In-Progress Time ($IPT_2$)+Duration of non program segments that occurred prior to Second In-Progress Time]

It should be appreciated that without consideration of advertisement segments that have occurred before the second in progress time, when the viewer resumes playback of the first program from a point in the content stream determined using the second in progress time, the point may deviate from the actual point the viewer left off. Thus, an in progress time that indicates a progress half-way through a show will vary by the number of advertisements before the in progress time in the content stream being output to resume viewing from the last point. The adjustments discussed in step 344 allows more precise adjustments to be applied to the calculated in progress time that will place the viewer to resume playing the content at a point that is the same or very close to the point they left off.

Operation proceeds from step 344 to step 346. In step 346 the control server communicates information including the adjusted second in progress time (Adj. $IPT_2$) to a content server, e.g., VOD server 154, responsible for providing second content stream including the viewer selected version of the first program to the second customer device. The information provided by the control server allows the content server to provide the second content stream to the customer device in a way that allows the viewer to resume playback from the last scene or point in time where the viewer stopped watching last time. Following receipt of the information provided by the control server, the content server can use the information to provide the second content stream to the second customer device. Operation proceeds from step 346 via connecting node B 348 back to step 304.

In some embodiments the control server calculates the second in progress time in an alternative manner. In such embodiments, rather than using the program duration of the selected version of the first program, the duration of the second content stream (denoted by $D_s$) is used in calculation of the second in progress time. The duration of the second content stream includes the duration of non program segments, e.g., advertisements. In such embodiments the steps 336 through 344 are not performed and the second in progress time is calculated based on the second content stream duration ($D_s$) and the normalized in progress time (NrPT). In such embodiments the second in progress time is calculated by multiplying the second content stream duration ($D_s$) to the normalized in progress time (NrPT). Thus in such embodiments the second in progress time can be expressed as:

$$IPT_2 = [(NrPT) \times (D_S)] \quad (3)$$

The second content stream duration ($D_s$) used in the calculation of the in progress time ($IPT_2$) already includes the duration of advertisements, there is no need for adjustments to the second in progress time ($IPT_2$) for advertisement durations as done in step 344. Following the calculation of the second in progress time ($IPT_2$) in the alternative manner discussed above and shown in equation (3), the control server communicates information including the second in progress time ($IPT_2$) to a content server, e.g., VOD server 154, responsible for providing second content stream including the viewer selected version of the first program to the second customer device.

Figure 4:
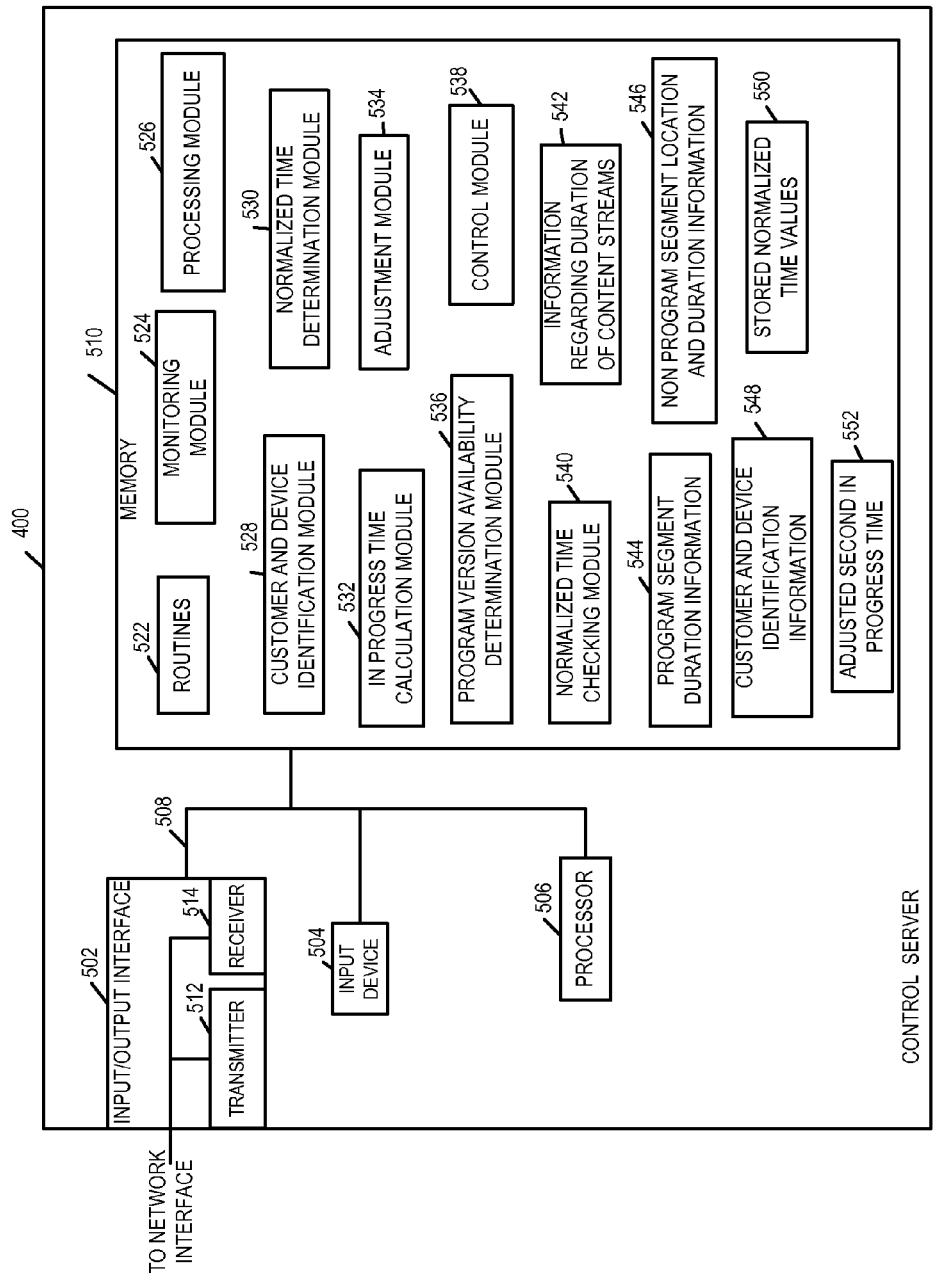
FIG. 4 illustrates an exemplary control server implemented in accordance with some exemplary embodiments.

FIG. 4 illustrates an exemplary control server 400 implemented in accordance with an exemplary embodiment. The exemplary control server 400 can be, and in some embodiments is, used as the control server 158 shown in FIG. 1. In some embodiments the control server 400 is configured to implement at least some of the steps of the method of flowchart 300. In accordance with one aspect of some embodiments the exemplary control server 400 determines a normalized in progress time value from a first in progress time corresponding to a content stream including a first program being output to a viewer, in accordance with the invention. In various embodiments the normalized in progress time value is used to calculate a second in progress time to be used in streaming a second content stream including the first program to the viewer to resume playback from the last point the viewer left viewing.

As shown, the control server 400 includes an input/output (I/O) interface 502, an input device 504, a processor 506, and a memory 510 coupled together via a bus 508. The various elements of the control server 400 can exchange data and information over the bus 508.

The I/O interface 502 includes a transmitter 512 and a receiver 514. In some embodiments via the I/O interface 502 the control server 400 is coupled to the network interface 168 of the headend 102 via which information is communicated with the devices located at the customer premises over communications network 170. Furthermore via the I/O interface 502, the control server 400 can exchange signals and/or information with other devices and/or system elements such as the servers in the network headend 102 over the local network 166 of system 100.

The input device 504 may be a keypad, touch screen, and/or other device for receiving and processing input commands/instructions. The processor 506, e.g., a CPU, executes control routines 522 and one or more modules to control the control server 400 to operate in accordance with the invention and implement one or more steps of the method of flowchart 300. Thus to control the operation of control server 400, the processor 506 uses information, various modules and/or routines including instructions stored in memory 510.

In addition to the routines 522, the memory 510 includes a monitoring module 524, a message processing module 526, a customer and device identification module 528, a normalized time value determination module 530, an in progress time calculation module 532, an adjustment module 534, a program version availability determination module 536, a control module 538, a stored normalized time checking module 540, information indicating duration of content streams 542, stored program segment duration information 544, stored non program segment location and duration information 546, and received customer and device identification information 548.

Routines 522 include communications routines and/or device control routines. The monitoring module 524 is configured to monitor for messages and/or signals from other devices, e.g., customer premise devices located at customer premises as well as other devices at the headend or located externally. In various embodiments the monitoring module 524 is configured to monitor for a signal indicating an in-progress point in time corresponding to a content stream communicating a first program, from a customer device, e.g., STB. The in-progress time corresponding to the content stream including the program content that a viewer has started to watch indicates a relative location within a content stream (e.g., audio, video and/or multimedia stream) that represents a point up to which the content stream has been played out. The control server 400 is configured to receive, e.g., via the receiver 514 of interface 502, a signal including a first in progress time indicating an in progress time of a first content stream being output to a viewer, e.g., indicating a point in time up to which the first content stream has been output from the point the play out started.

The processing module 526 is configured to process various messages and/or signals received by the control device 400, e.g., via the interface 502, e.g., such as the in progress time reporting signal, content request signal and/or other signals from devices and processing the received signals to recover information. In various embodiments the processing module 526 is configured to process the received messages and/or signals and provide recovered information to the processor 506 and/or one or more other modules to take further action in response to the received signals.

The customer and device identification module 528 is configured to identify a customer and customer device from which a signal, e.g., first in progress time reporting signal, is received. In some embodiments the identification module 528 uses information included in the received signal to identify the customer device from which the signal is received. In some embodiments the control server 400 may seek customer information from the customer database 162 in order to identify the customer associated with the customer premise device. It is described that such information is available or can be accessed in various ways, for example, see for example the discussion related to step 308

The normalized time determination module 530 is configured to determine a normalized in progress time value in accordance with the invention as discussed in detail in step 308 (including steps 310 through 316). Thus the normalized time determination module 530 is configured to generate, from the first in progress time and information indicating a first program duration, a normalized in progress time. The information regarding the first program duration is included in the stored program segment duration information 544 stored in the memory 510. In some embodiments the stored program segment duration information 544 includes program duration information corresponding to various programs and is provided to the control server 400, e.g., by the content provider system 101. As should be appreciated, the normalized time determination module 530 performs the operation discussed in steps 308 through 316 of flowchart 300 to generate the normalized time value (NrPT), e.g., using the in progress time received from the customer device and other information such as the program segment duration information 544 and non program segment locations and duration information 546. Such info is available to or can be accessed by the control server in various ways.

The generated normalized time value (NrPT) is stored in the memory 510 as part of a set of normalized time values 550.

In various embodiments when the control server 400 receives a request signal indicating a viewer's selection of the first program for playback from a second customer device, the processing module 526 is configured to process the request signal and determine, e.g., using the information identifying the requested program included in the request signal, if the request signal corresponds to the first program that was being viewed by the viewer at some pint in time earlier. In some embodiments the processing module 526 is further configured to determine, e.g., using other information included in the request signal, the corresponding customer/viewer information, second device identification and device type information, and information regarding the content stream formats that the second device supports.

When it is determined that the request signal is for resuming playback of the first program that was being viewed earlier, the program version availability determination module 536 determines if there are multiple versions of the first program, e.g., corresponding to different service types that can be used for viewing, available for the given viewer.

The control module 538 is configured to send information to the second customer device, e.g., via the interface 502, to allow the viewer (operating the second customer device) to choose from multiple available versions of the first program to resume playback when it is determined by the determination module 536 that multiple versions of the first program are available. After receiving the information from the control server 400 the second customer device may present a prompt to the user with a list of options to choose from. When the viewer chooses one of the versions of the first program for playback a selection signal is automatically sent, in some embodiments, to the control server 400 where it is received and processed by the processing module 526. The recovered information from the received selection signal is provided by the processing nodule 526 to the program version availability determination module 536 which determines, based on the recovered information, a version of the first program selected by the viewer. When the determination module 536 determines that multiple versions of the first program are not available, the control server 538 is configured to set the only available version of the selected program as the selected version to be supplied to the viewer for playback. Thus in some embodiments the selected version of the first program is the only version of the first program available to the viewer for resuming playback of the first program.

The normalized time checking module 540 is configured to check if there is a record of a normalized time value corresponding to the first program selected by the customer/viewer, e.g., stored by the control server 400 at some point in time earlier. In some embodiments normalized time values corresponding to various programs and customers who were viewing the programs are stored in the 510 as stored normalized time values 550. Thus in some embodiments the checking module 540 accesses the stored normalized time values 550 to check if a record for the normalized time value corresponding to the first program exists.

If the checking module 540 determines that a normalized time value corresponding to the selected title for the requesting viewer/customer device is not stored, the control module 538 sends a signal to a content server responsible for providing selected program content to the second customer device to proceed with supplying the content corresponding to the selected title in the normal manner, e.g., providing a content stream including the first program starting from the beginning first program.

The in progress time calculation module 532 is configured to determine, based at least on the normalized in progress time value (NrPT), a second in progress time to be used in streaming a second content stream to the viewer. The second content stream includes the selected version of the first program requested by the viewer for playback. The operation of determining a second in progress time is discussed in detail in steps 336, 338, 340 and 342. In some embodiments the in progress time calculation module 532 is configured to perform the function corresponding to these steps to calculate the second in progress time. Thus as part of determining the second in progress time in some embodiments the in progress time calculation module 532 is configured to access information indicating a program duration of the selected version of the first program and determine the second in progress time based on the program duration ($D_2$) corresponding to the selected version of the first program and the normalized in progress time (NrPT). The determined second in progress time ($IPT_2$) shown in equation (2) is an output of the in progress time calculation module 532. The information indicating the program duration of various version of the first program may be provided by the content provider system 101 and stored by the control server 400 in memory 510 as part of the information set 544 or the information may be accessed from an external server. In some embodiments the program duration of the selected version of the first program used for calculating the second in progress time does not include the duration of non program segments, e.g., advertisements. The program duration of the selected version of the first program may be different than the first program duration used for calculating the normalized time value.

The adjustment module 534 is configured to adjust the determined second in progress time ($IPT_2$) to take into consideration the duration of non program segments, e.g., advertisements, in the second content stream that have occurred at time locations prior to the second in progress time. An output of the adjustment module 534 is the adjusted second in progress time (Adj. $IPT_2$).

In various embodiments the control module 538 is further configured to communicate information including the adjusted second in progress time (Adj. $IPT_2$) to a content server, e.g., VOD server 154, responsible for providing second content stream including the viewer selected version of the first program to the second customer device. The information including the adjusted second in progress time (Adj. $IPT_2$) may be provided by the control server 400 in response to the request signal from the second customer device indicating viewer's selection of the first program for playback. In some embodiments the information including the adjusted second in progress time (Adj. $IPT_2$) may be provided by the control server 400 in response to a request for in progress time from the content server, e.g., VOD server 154.

In some other embodiments second in progress time is calculated in an alternative manner. In some such embodiments the in progress time determination module 532 is configured to calculate the second in progress time using the duration of the second content stream ($D_s$) rather than using the program duration ($D_2$) of the selected version of the first program. In such embodiments the in progress time determination module 532 is configured to determine the second in progress time based on the second content stream duration ($D_s$) and the normalized in progress time (NrPT) and calculates the second in progress time ($IPT_2$) by multiplying the second content stream duration ($D_s$) to the normalized in progress time (NrPT) as expressed in equation (3). In some such embodiments the control module 538 is configured to communicate information including the second in progress time ($IPT_2$) calculated in accordance with equation (3) to a content server, e.g., VOD server 154, responsible for providing second content stream including the viewer selected version of the first program to the second customer device.

In the present application it should be appreciated that content can include video content such as TV programs, movies, news, etc. and/or audio content such as radio programs or music channels.

Various features of the embodiments of the present invention provide consistent user experience across multitude of video products and devices. Various features eliminate or minimize an annoying inability to use bookmarking between viewings of different content accurately. Various features of the invention facilitate maintaining accurate and manageable record of content, e.g., shows, costumer is interacting with.

A service provider, e.g., cable service provider, offers its costumers access to variety of products, e.g., content services, in many different formats and types. Same movie/show title can be viewed on the TV screen using a QAM Set-top box or on any variety of IP enabled companion devices, such as iPAD, Android tablet, PC browser, smart TV, gaming station and more. At the same time a given movie/show can be available in different types, e.g., versions, such as: Free On-Demand, Premium On-Demand, time-shifted live or recorded on disk.

As the service provider allows its customers to go from one device to another or from type to type, for their video consumption, the features of the present allow the service provider to offer the customer unimpaired way of maintaining their in-progress point of show/movie they have started to watch. The In-progress point, sometimes referred to as Normal Play Time (NPT), is a relative location within a content stream (audio, video and/or multimedia stream) that puts a viewer/customer as close as possible or directly at the scene the viewer/customer was watching last time.

Various features of the invention work across a variety of different kinds of devices including iOS and Android based devices, internet capable SmartTVs, gaming stations, streaming devices such as Roku box, STBs etc., as well as across various stream types including, e.g., Quadrature amplitude modulated (QAM) streams, HTTP Live Streaming (HLS), HTTP Live Streaming (HSS), Live, On-Demand, Free, Premium etc. The features of the present invention cover adaptive bit rate (ABR) video streams as well as streams on QAM transport.

An in progress time for a live version of a first program played using Live video service may not be applicable to a free version of the same program played at a later time using, e.g., free on-demand service. In such a case if the in progress time for the live version of the first program is used when the customer resumes watching the free version of the same program at a later time, the program may pickup at a point that may deviate by several minutes. This is an annoyance to customers who must then fast forward or rewind to get back to the point they left off. The features of the present invention allows the service provider to maintain a normalized time using which in progress time for various version of the content can be easily determined. The normalized time While calculating and maintaining accurate in progress time information corresponding to content for various customers, various features of the invention also take into account the modified duration of some programming content, e.g., shows, that have been modified from original theatrical versions, content with and without advertisement breaks and content with digital advertisement insertion (DAI) inserts.

Consider an example where the elements of the exemplary system 100 implemented in accordance with the invention is used to provide content service to a viewer, e.g., customer corresponding to customer premise 104. Consider that the viewer is watching live content using a subscription service on one of the devices 110, 114, 116. The content includes of the actual program content (e.g., show) plus advertisements. Slots are pre-allocated in the content in which advertisements can be placed. The placement slot locations are defined by time and are sent to the digital Ad Insertion system 108 from the provider of the live content 101. In some embodiments the AIS 108 detects when it is time to insert an advertisement and readies the placement. In one instance, the advertisement server 160 simply gets the advertisement in queue to be played in lieu of the original content (the slot intended for advertisement is black video) and begins play out upon receipt of an SCTE-35 advertisement indicator. The SCTE-35 advertisement indicators are, e.g., markers, that are used to provide more accurate placement than can be achieved by time synchronization. In this instance, the accurate timing is used to update the meta-data describing the advertising position for use when calculating a bookmark position, e.g., in progress time within the content. In the cases when no SCTE-35 marker is available the system relies entirely on time synchronization and thus the control server 158 calculating the normalized time value and in progress time relies on the advertisement metadata provided, e.g., by the content provider system 101.

Continuing with the above example, when the viewer stops watching the live content, the device the viewer is using, e.g., STB 110, contacts the control server 158 and records a first in progress time ($IPT_1$) indicating a relative location within a content stream that represents a point up to which the content has been played out. Following the receipt of the first in progress time ($IPT_1$), in accordance with one aspect of the invention the control server 158 calculates a normalized in progress program time value (NrPT) that can be represented by the following equation:

$$NrPT = \frac{[\text{Adjusted First In-Progress Time (Adj. } IPT_1)]}{[\text{First Program Duration } (D_1)]} \times 100 \quad (1)$$

where Adjusted First In-Progress Time represented as "Adj. $IPT_1$" and is determined as:

Adj.$IPT_1$=[First In-Progress Time ($IPT_1$)−Duration of advertisements that occurred prior to First In-Progress Time]

where the non program segments include, e.g., advertisements, and the first program duration "$D_1$" is the duration of the Live version of the program content only that the viewer was watching (excluding the duration of any non-program segments, e.g., advertisement segments). The control server stores the calculated normalized time value (NrPT). Thus in accordance with one feature of the invention the reported in progress time is translated into a percentile point of stream location relative to the currently accessed stream length.

At a later time when the viewer decides to resume playback to pick up where he/she left off on a different device, for example on device 2 114, in accordance with the features of some embodiments of the invention the viewer is offered the opportunity to view a Free On Demand copy of the content with advertisements laced in or a paid Video On-Demand premium version with no advertisements. It should be appreciated that while different versions, e.g., the live version being previously viewed, the Free on-demand version and the on-demand premium version correspond to the same program content/title (e.g., show), in some embodiments the duration of each of these versions may be different.

When the viewer selects one of the options, e.g., say Free on-demand version, a request is sent from the device 114 to the control server 158 which compares the service types and/or content version types selected for initial viewing and the one selected for resuming playback. The control server 158 determines that the two versions are different and accordingly a in progress time that is applicable to the selected version of the content should be calculated. The control server 158 retrieves the corresponding stored normalized time value (NrPT) and uses that to calculate a second in progress time ($IPT_2$) that can be used to provide a second content stream including the selected version of the program to the customer device 114 that will allow resuming playback of the content from the last point.

The control server 158 calculates the second in progress time ($IPT_2$) as:

$$IPT_2 = \frac{[(NrPT) \times (D_2)]}{100} \qquad (2)$$

where "$D_2$" is the program duration corresponding to the selected version (e.g., Free on-demand) of the program. Furthermore, in some embodiments the control server 158 adjusts the calculated second in progress time ($IPT_2$) to take into consideration the duration of advertisements in the second content stream that have occurred prior to the second in progress time to determine an adjusted second in progress time (Adj. $IPT_2$) as follows:

Adj.$IPT_2$=[Second In-Progress Time ($IPT_2$)+Duration of advertisements that occurred prior to Second In-Progress Time]

Thus the Adj. $IPT_2$ calculated in accordance with the invention can be used to place the viewer at or very close to the point where the viewer stopped viewing.

As an example consider that a viewer watching original title of "Weeds" using On-Demand premium service, where the original On-Demand premium version is 30 min long. The user stops viewing at 360 seconds into the original title. Thus the first in progress time ($IPT_1$) in this case is 360 seconds, the duration ($D_1$) of the title is 30 minutes (30×60 seconds) since the On-Demand premium version does not include advertisements.

Using the first in progress time of 360 seconds and the duration of the title ($D_1$) the control server calculates and stores a normalized time value using equation (1) as:

$$NrPT = \frac{[360]}{[(30 \times 60)]} \times 100 = 20.00$$

Consider that later on the viewer selects a Free version of the same title "WEEDS" with new adjusted for TV time 25 minutes, stripped of all advertisement breaks. Thus the duration ($D_2$) of the selected version of "WEEDS" is 25 minutes (25×60 seconds). Accordingly the control server 158 calculates a second in progress time ($IPT_2$), in accordance with equation (2), using the stored normalized time value (NrPT=20.00) that can be applied to the 25 minute version of "Weeds".

$$IPT_2 = \frac{[(20) \times (25 \times 60)]}{100} = 300 \text{ seconds}$$

Thus we get a location of 300 seconds into the content stream including the selected Free version of "WEEDS". To place viewer as close as possible to last scene, the control server can use the advertisement metadata information indicating the duration and location of advertisements in the content stream including the 25 minute version of "WEEDS" to adjust the second in progress time $IPT_2$. Thus, for example if 3 advertisement segments of 60 seconds each occurred in the content stream prior to the calculated 300 seconds in progress time, the control server calculates the adjusted second in progress time (Adj. $IPT_2$) as follows:

Adj.$IPT_2$=[($IPT_2$+(ad segments durations that occurred prior to $IPT_2$)] therefore Adj.$IPT_2$= [300+180]=480 seconds Thus in the above example the adjusted in progress time for the active stream including the Free version of "WEEDS" is 480 seconds.

An exemplary method of providing program content to a viewer, comprises: receiving a first in progress time indicating an in progress time of a first content stream being output to the viewer; generating from the first in progress time and information indicating a first program duration, a normalized in progress time, the first program duration being a duration of a first version of a first program being communicated by the first content stream, the first program duration excluding the duration of any non-program segments included in the first content stream; and determining, from the normalized in progress time, a second in progress time to be used in streaming a second content stream to the viewer.

In various embodiments the second content stream includes content corresponding to the same program title as the first content stream, the first and second content streams differing in at least one of non-program segment content or overall stream duration. In some embodiments at least some of the non-program segments are advertising segments.

In some embodiments generating from the first in progress time and information indicating a first program duration, a normalized in progress time includes: accessing stored information indicating the duration and location of non-program segments in said first content stream; and subtracting from the first in progress time an amount of time equal to the duration of non-program segments in said first content stream which occurred prior to first in progress time to generate a first adjusted in progress time. In some embodiments generating from the first in progress time and information indicating a first program duration a normalized in progress time further includes determining the normalized in-progress time from the first adjusted in progress time and the first program duration. In some embodiments determining the normalized in-progress time from the first adjusted in progress time and said first program duration includes dividing the adjusted in progress time by said first program duration. In some embodiments the normalized in progress time is stored e.g., as a decimal value indicating the fraction of the first program which has already been viewed in memory.

In some embodiments determining from the normalized in progress time a second in progress time to be used in streaming a second content stream to the viewer includes: accessing information indicating a program duration of a second version of the first program, said program duration being a duration of the second version of said first program, said second version of the first program being a selected version of the first program to be streamed via the second content stream to the viewer; and determining, based on said program duration of the second version of said first program and said normalized in progress time, said second in progress time. In some embodiments the selected version of the first program is selected from a plurality of available version of the first program by the viewer for resuming playback of the first program. In some embodiments the selected version of the first program is the only version of the first program available to the viewer for resuming playback of the first program. In some embodiments the program duration is a program duration which does not include non-program segments.

In some embodiments determining, based on said second program duration and said normalized in progress time, said second in progress time, includes: multiplying said program duration of the second version of said first program by said normalized in progress time to obtain the second in progress time. In some embodiments the method further comprises adjusting the second in progress time to take into consideration the duration of non-program segments included in said second content stream at locations prior to the second in progress time to obtain an adjusted second in progress time.

In some embodiments determining from said normalized in progress time a second in progress time to be used in streaming a second content stream to said viewer includes: accessing information indicating a second stream duration, second stream duration being a duration of said second content stream; and determining, based on said second stream duration and said normalized in progress time, said second in progress time. In some embodiments determining, based on the second stream duration and the normalized in progress time, the second in progress time includes multiplying the second stream duration with the normalized in progress time.

In some embodiments various modules in the control device 400 are implemented fully in hardware, e.g., as individual circuits, within a processor of the device 400. In other embodiments some of the modules are implemented, e.g., as circuits, within the device processor with other modules being implemented, e.g., as circuits, external to and coupled to the processor. Alternatively, in some other embodiments rather than being implemented as circuits, all or some of the modules may be implemented in software and stored in the memory of the device 400, with the modules controlling operation of the corresponding device to implement the functions corresponding to the modules when the modules are executed by a processor, e.g., such as processor 506 of device 400.

In still other embodiments, various modules are implemented as a combination of hardware and software, e.g., with a circuit external to the processor providing input to the processor which then under software control operates to perform a portion of a module's function.

While the control server 400 in FIG. 4 is shown to include a single processor, e.g., computer, within the device, it should be appreciated that the processor may be implemented as one or more processors, e.g., computers. When implemented in software, the modules include code, which when executed by the processor of the device 400, configure the processor, e.g., computer, to implement the function corresponding to the module. In some embodiments, the processor included in the corresponding device is configured to implement each of the modules.

Completely hardware based or completely software based modules may be used. However, it should be appreciated that any combination of software and hardware (e.g., circuit implemented) modules may be used to implement the functions. As should be appreciated, the modules included in the control server 400 illustrated in FIG. 4 control and/or configure the control server 400 or elements therein such as the corresponding processor to perform the functions of the steps illustrated and/or described in the method of flowchart 300.

Various embodiments have been discussed above. It should be appreciated that the invention is not intended to be limited by the exemplary embodiments which are to facilitate an understanding of the invention and its many possible applications.

In various embodiments system elements described herein are implemented using one or more modules which are used to perform the steps corresponding to one or more methods of the present invention.

In the above described methods, in some embodiments, each step may be performed by one or more different software instructions executed by a computer processor, e.g., a central processing unit (CPU). At least one system implemented in accordance with the present invention includes a means for implementing each of the various steps which are part of the methods of the present invention. Each means may be, e.g., an instruction, processor, hardware circuit and/or combination of elements used to implement a described step.

Many of the above described methods or method steps can be implemented using machine, e.g., computer, executable instructions, such as software, included in a non-transitory machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A method of providing program content to a viewer, the method comprising:
    storing program content in a content storage device;
    receiving a first in progress time indicating an in progress time of a first content stream being output to the viewer on a first playback device, said first content stream communicating at least a portion of a first version of a first program, said first version of the first program being in a first format and having a first program duration, said first program duration excluding a duration of any non-program segments included in said first content stream;
    generating from the first in progress time and information indicating the first program duration, a normalized in progress time;
    storing said normalized in progress time in memory;
    operating a control device to determine, from said normalized in progress time, a second in progress time to be used in streaming a second content stream to said viewer, said second content stream communicating a second version of said first program having a second program duration which is different from said second program duration, said second version being different than said first version, said second program duration excluding any non-program segments included in said second content stream; and
    operating a content server to use said second in progress time to stream said second content stream to a second playback device.

2. The method of claim 1,
    wherein advertisements are non-program segments;
    wherein said first version of said first program is in a different format than said second version of said first program; and
    wherein said content server uses said second in progress time as a streaming starting point.

3. The method of claim 1,
    wherein said first and second versions of the first program correspond to a program title of the first program which is the same; and
    wherein generating from the first in progress time and information indicating the first program duration, a normalized in progress time includes:

accessing stored information indicating the duration and location of non-program segments in said first content stream; and subtracting from the first in progress time an amount of time equal to the duration of non-program segments in said first content stream which occurred prior to first in progress time to generate a first adjusted in progress time.

4. The method of claim 1, wherein the normalized in progress time is different from said the first in progress time.

5. The method of claim 3, wherein said different formats include different MPEG formats;

wherein generating from the first in progress time and information indicating the first program duration a normalized in progress time further includes:

determining said normalized in-progress time from said first adjusted in progress time and said first program duration.

6. A method of providing program content to a viewer, the method comprising:

storing program content in a content storage device;

receiving a first in progress time indicating an in progress time of a first content stream being output, by a first playback device, to the viewer;

generating from the first in progress time and information indicating a first program duration, a normalized in progress time, said first program duration being a duration of a first version of a first program being communicated by said first content stream, said first program duration excluding the duration of any non-program segments included in said first content stream, said generating from the first in progress time and information indicating a first program duration a normalized in progress time including:

accessing stored information indicating the duration and location of non-program segments in said first content stream;

subtracting from the first in progress time an amount of time equal to the duration of non-program segments in said first content stream which occurred prior to first in progress time to generate a first adjusted in progress time; and determining said normalized in-progress time from said first adjusted in progress time and said first program duration, said determining said normalized in-progress time from said first adjusted in progress time and said first program duration including:

dividing the adjusted in progress time by said first program duration; and operating a control device to determine, from said normalized in progress time, a second in progress time to be used in streaming a second content stream to said viewer; and operating a content server to use said second in progress time to stream said second content stream to a second playback device.

7. The method of claim 6, further comprising:

storing in memory said normalized in progress time.

8. The method of claim 7, wherein determining from said normalized in progress time a second in progress time to be used in streaming a second content stream to said viewer includes:

accessing information indicating a program duration of a second version of the first program, said program duration being a duration of the second version of said first program, said second version of the first program being a selected version of the first program to be streamed via the second content stream to the viewer; and determining, based on said program duration of the second version of said first program and said normalized in progress time, said second in progress time.

9. The method of claim 8, wherein said program duration is a program duration which does not include non-program segments.

10. The method of claim 9, wherein determining, based on said second program duration and said normalized in progress time, said second in progress time, includes:

multiplying said program duration of the second version of said first program by said normalized in progress time to obtain the second in progress time; and wherein the method further comprises adjusting said second in progress time to take into consideration the duration of non-program segments included in said second content stream at locations prior to said second in progress time to obtain an adjusted second in progress time.

11. The method of claim 9, wherein determining from said normalized in progress time a second in progress time to be used in streaming a second content stream to said viewer includes:

accessing information indicating a second stream duration, second stream duration being a duration of said second content stream; and determining, based on said second stream duration and said normalized in progress time, said second in progress time.

12. The method of claim 11, wherein determining, based on said second stream duration and said normalized in progress time, said second in progress time includes multiplying said second stream duration with said normalized in progress time.

13. A system comprising:

a content storage device storing program content;

a control device comprising:

an interface including a receiver configured to receive a first in progress time indicating an in progress time of a first content stream being output to a viewer on a first playback device, said first content stream communicating at least a portion of a first version of a first program, said first version of the first program being in a first format and having a first program duration, said first program duration excluding a duration of any non-program segments included in said first content stream;

a normalized time determination module configured to generate, from the first in progress time and information indicating the first program duration, a normalized in progress time;

a memory for storing said normalized in progress time; and an in progress time calculation module configured to determine, from said normalized in progress time, a second in progress time to be used in streaming a second content stream to said viewer, said second content stream communicating a second version of said first program having a second program duration which is different from said first program duration, said second version being different than said first version, said second program duration excluding any non-program segments included in said second content stream; and a content server configured to use said second in progress time to stream said second content stream to a second playback device.

14. The system of claim 13, wherein said first version of said first program is in a different format than said second version of said first program; and
wherein said content server uses said second in progress time as a streaming starting point.

15. The system of claim 13,
wherein said first and second versions of the first program correspond to a program title of the first program which is the same; and
wherein said normalized time determination module is further configured, as part of being configured to generate from the first in progress time and information indicating a first program duration a normalized in progress time, to:
access stored information indicating the duration and location of non-program segments in said first content stream; and
subtract from the first in progress time an amount of time equal to the duration of non-program segments in said first content stream which occurred prior to first in progress time to generate a first adjusted in progress time.

16. The system of claim 15, wherein said normalized time determination module is further configured, as part of being configured generate a normalized in progress time, to:
determine said normalized in-progress time from said first adjusted in progress time and said first program duration.

17. The system of claim 16, wherein said normalized time determination module is further configured determine said normalized in-progress time from said first adjusted in progress time and said first program duration by dividing the adjusted in progress time by said first program duration.

18. The system of claim 17, wherein said in progress time calculation module is further configured, as part of being configured to determine the second in progress time to be used in streaming a second content stream to said viewer, to:
access information indicating a program duration of a second version of the first program, said program duration being a duration of the second version of said first program, said second version of the first program being a selected version of the first program to be streamed via the second content stream to the viewer, said program duration being a program duration which does not include non-program segments; and
determine, based on said program duration of the second version of said first program and said normalized in progress time, said second in progress time.

19. The system of claim 18,
wherein said in progress time calculation module is further configured, as part of being configured to determine the second in progress time to be used in streaming a second content stream to said viewer, to multiply said program duration of the second version of said first program by said normalized in progress time to obtain the second in progress time; and
wherein said apparatus further includes an adjustment module configured to adjust said determined second in progress time to take into consideration the duration of non-program segments included in said second content stream at locations prior to said second in progress time.

\* \* \* \* \*